(12) United States Patent
Gillig et al.

(10) Patent No.: US 10,739,308 B2
(45) Date of Patent: Aug. 11, 2020

(54) ION MOBILITY ANALYZER AND ANALYSIS METHOD

(71) Applicant: SHIMADZU RESEARCH LABORATORY(SHANGHAI) CO., LTD., Shanghai (CN)

(72) Inventors: Kent James Gillig, Shanghai (CN); Keke Wang, Shanghai (CN); Wenjian Sun, Shanghai (CN); Xiaoqiang Zhang, Shanghai (CN)

(73) Assignee: SHIMADZU RESEARCH LABORATORY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/321,164

(22) PCT Filed: Jun. 15, 2018

(86) PCT No.: PCT/CN2018/091594
§ 371 (c)(1),
(2) Date: Jan. 28, 2019

(87) PCT Pub. No.: WO2018/224049
PCT Pub. Date: Dec. 13, 2018

(65) Prior Publication Data
US 2019/0162698 A1    May 30, 2019

(30) Foreign Application Priority Data
Jun. 6, 2017   (CN) .......................... 2017 1 0419157

(51) Int. Cl.
*G01N 27/62* (2006.01)
*H01J 49/42* (2006.01)
(Continued)

(52) U.S. Cl.
CPC .......... *G01N 27/622* (2013.01); *H01J 49/061* (2013.01); *H01J 49/10* (2013.01); *H01J 49/4215* (2013.01)

(58) Field of Classification Search
USPC ......................................... 250/286
See application file for complete search history.

(56) References Cited

U.S. PATENT DOCUMENTS 6,630,662 B1   10/2003   Loboda
7,718,960 B2    5/2010   Hashimoto et al.
(Continued)

FOREIGN PATENT DOCUMENTS

CN    1758057 A    4/2006
CN  103871820 A    6/2014
(Continued)

OTHER PUBLICATIONS

Zeleny, John, B.SC.,"VI. On the ratio of the velocities of th two ions produced in gases by Rontgen Radiation; and on some related phenomena", Philosophical Magazine Series 5, 46:278, 120-154, Dec. 2014.
(Continued)

*Primary Examiner* — Kiet T Nguyen
(74) *Attorney, Agent, or Firm* — Tim Tingkang Xia, Esq.; Locke Lord LLP

(57) ABSTRACT

The invention provides ion mobility analyzer and analysis method. The analyzer includes an ion source, a first drift/analyzer region provided with an ions entrance, a second drift/analyzer region provided with an ions exit, a connection region connecting the first drift/analyzer region and the second drift/analyzer region, and a detector connected to the ion exit. Direct current electric fields and gas flows in the first drift/analyzer region and the second drift/analyzer region apply opposing forces on ions, and first and second
(Continued)

gas flows have the same gas flow direction. The connection region includes a third direct current electric field that causes ions to transfer from the first drift/analyzer region to the second drift/analyzer region. Because the first and second regions have the same gas flow direction, the invention achieves stable resolution and sensitivity as a high-resolution ion mobility analyzer and/or an ion mobility filter for a continuous ion beam.

23 Claims, 10 Drawing Sheets

(51) Int. Cl.
*H01J 49/10* (2006.01)
*H01J 49/06* (2006.01)

(56) References Cited

U.S. PATENT DOCUMENTS

| | | |
|---|---|---|
| 7,838,826 B1 | 11/2010 | Park |
| 9,281,170 B2 | 3/2016 | Park et al. |
| 2007/0290128 A1* | 12/2007 | Hashimoto .......... G01N 27/622 250/286 |
| 2008/0073503 A1* | 3/2008 | Wu ...................... G01N 27/622 250/283 |
| 2009/0173880 A1* | 7/2009 | Bateman ............... H01J 49/065 250/292 |
| 2011/0266435 A1* | 11/2011 | Hoyes .................. G01N 27/622 250/282 |
| 2012/0228491 A1* | 9/2012 | Wu ...................... G01N 27/622 250/282 |
| 2013/0187044 A1* | 7/2013 | Ding ..................... H01J 49/065 250/292 |
| 2015/0008318 A1* | 1/2015 | Makarov .............. G01N 27/622 250/283 |
| 2018/0340910 A1* | 11/2018 | Betz .................... G01N 27/622 |
| 2019/0103261 A1* | 4/2019 | Ibrahim ................ H01J 49/061 |

FOREIGN PATENT DOCUMENTS

| | | |
|---|---|---|
| CN | 105869980 A | 8/2016 |
| JP | 2005174619 A | 6/2005 |

OTHER PUBLICATIONS

State Intellectual Property Office of the P.R. China (ISR/SIPO), "International Search Report for PCT/CN2018/091594", NL, dated Sep. 19, 2018.

* cited by examiner

ION MOBILITY ANALYZER AND ANALYSIS METHOD

FIELD OF THE INVENTION

The present invention relates to the field of ion mobility spectrometry and ion analysis, and in particular to an ion mobility analyzer and analysis method.

BACKGROUND OF THE INVENTION

Ion Mobility Spectrometry (IMS) is a technique used to separate ions in terms of their ion mobility with respect to a drift/buffer gas. According to different separation manners, ion mobility spectrometers can be generalized into two types: separation by time and separation by distance. A traditional time-of-flight ion mobility spectrometer belongs to the type of separation by time, and a differential mobility spectrometry analyzer belongs to the type of separation by distance. The ion mobility spectrometers are limited by ion diffusion and therefore have poor resolution and sensitivity compared with a mass spectrometer. But ion mobility spectrometers can provide additional information based on a molecular collision cross section or operate as ion pre-separation apparatuses for mass spectrometer. The resolution of a differential mobility spectrometer can be improved by optimizing a geometric structure of the apparatus (for example, inclined fields, cross flow fields, and periodic focusing differential mobility spectrometers). The resolution of a time-of-flight mobility spectrometer can be improved by increasing the length of a drift tube, raising an applied voltage, and adding radial confining electric fields (for example, radio frequency ion funnels, radio frequency quadrupole fields, and direct current periodic electrostatic fields).

To further increase the resolution, the gas flow direction and electric field can oppose each other as described by Zeleny (Zeleny, J. *Philos, Mag.* 46, 120(1898)) in the parallel flow analyzer. The Zeleny apparatus consists of two parallel grids between which ions of a particular mobility could be balanced under the two opposing forces (gas flow and electric field). Several attempts have been made to achieve a parallel flow analyzer, including an inclined grid method, ion trap with gas flow present, orthogonal extraction ion mobility spectrometer, Loboda segmented quadrupole field with opposing gas flow, and parallel flow ion mobility spectrometer/later trapped ion mobility spectrometer proposed by Park. Experimentally, the only successful apparatuses have resulted from approaches of Loboda and Park, both using radio frequency quadrupole fields to confine ions radially. In U.S. Pat. No. 6,630,662 B1, Loboda used a uniform electric field, and the electric field increases slowly to sweep ions out against the gas flow. In U.S. Pat. No. 7,838,826 B1, Park used a non-uniform electric field to first separate ions having different ion mobilities, and then the electric field decreases slowly so that ions are swept out of the analyzer by the gas flow. Parks used a higher gas pressure than Loboda to achieve higher resolution, but his apparatus suffers from problems of a long analysis time and the limited number of ions per analysis.

To separate a continuous ion beam, an ion mobility filter can be used. A differential mobility spectrometer can separate ions with different mobilities along a direction perpendicular to a gas flow. In addition, a continuous ion beam can also be separated by setting a High pass/Low pass mobility filter. In U.S. Pat. No. 7,718,960 B2, Hashimoto et al. originally proposed such an apparatus including two ion drift regions. Each region has an electric field and a gas flow opposing from each other, and the directions of the gas flows in the two drift regions are opposite to each other. Gas in the apparatus is introduced perpendicularly from a connection region of the two regions. A schematic diagram of this apparatus is shown in FIG. 1A. In U.S. Pat. No. 9,281,170 B2, Parks also used the method of introducing gas perpendicularly, but the apparatus uses a radio frequency quadrupole field to confine ions radially. The schematic structural diagram of this apparatus is shown in FIG. 1B. Both Hashimoto and Parks High/Low pass filter apparatuses have a problem that the gas flow direction in the gas flow introducing region is not fixed and there exists obvious turbulence that will greatly impede the resolution and ion transmission of the apparatus.

Therefore, there is a need to further increase both the resolution and sensitivity of the ion mobility spectrometry. There is also a need for a mobility spectrometry apparatus that can achieve high resolution with a large ion capacity and can also operate as an ion mobility filter for a continuous ion beam while retaining high resolution and sensitivity.

SUMMARY OF THE INVENTION

In view of the above disadvantages of the prior art, an object of the present invention is to provide an ion mobility analyzer and analysis method to resolve the problems in the prior art. In order to accomplish the above and other related objects, the present invention provides an ion mobility analyzer, comprising: an ion source; a first drift/analyzer region provided with an ions entrance connected to the ion source, wherein the first drift/analyzer region comprises a first direct current electric field and a first gas flow, wherein the first direct current electric field and the first gas flow cause ions to move along an axis of the first drift/analyzer region, and wherein the first direct current electric field and the first gas flow apply opposing forces on ions; a second drift/analyzer region provided with an ions exit, wherein the second drift/analyzer region comprises a second direct current electric field and a second gas flow, wherein the second direct current electric field and the second gas flow cause ions to move along an axis of the second drift/analyzer region, wherein the second direct current electric field and the second gas flow apply opposing forces on ions, and the second gas flow has the same gas flow direction as the first gas flow; a connection region located between the first drift/analyzer region and the second drift/analyzer region, wherein the connection region comprises a third direct current electric field that causes ions to transfer from the first drift/analyzer region to the second drift/analyzer region; and a detector connected to the ion exit.

In an embodiment of the present invention, the first gas flow and the second gas flow are laminar flows.

In an embodiment of the present invention, an ion introducing direction of the ion entrance is perpendicular to the gas flow direction; and/or an ion extraction direction of the ion exit is perpendicular to the gas flow direction.

In an embodiment of the present invention, the ion source is located upstream or downstream of the gas flows.

In an embodiment of the present invention, the detector is located upstream or downstream of the gas flows.

In an embodiment of the present invention, the axis of the second drift/analyzer region is on a line different from that of the axis of the first drift/analyzer region.

In an embodiment of the present invention, the axis of the second drift/analyzer region is parallel to the axis of the first drift/analyzer region.

In an embodiment of the present invention, the first drift/analyzer region and the second drift/analyzer region are stacked parallel or arranged side by side.

In an embodiment of the present invention, the first drift/analyzer region and the second drift/analyzer region respectively comprise a series of electrode pairs arranged along the axis, a plane in which the electrode pairs are located is perpendicular to the gas flow direction, and radio frequency voltages with different phases are applied on the adjacent electrode pairs to form, in a direction perpendicular to the gas flow, a quadrupole field or a multipole field for confining ions.

In an embodiment of the present invention, the first drift/analyzer region and the second drift/analyzer region respectively comprise a series of electrode pairs arranged perpendicular to the axis, a plane in which the electrode pairs are located is parallel to the gas flow direction, and radio frequency voltages with different phases are applied on the adjacent electrode pairs to form, in a direction parallel to the gas flow, a quadrupole field or a multipole field for confining ions.

In an embodiment of the present invention, a segment of the second drift/analyzer region close to the detector comprises a plurality of electrodes, and voltages are applied on each of the plurality of electrodes to form an electric field for confining ions and focusing ions to the detector during transfer.

In an embodiment of the present invention, a mass analyzer is provided in a pre-stage, or a post-stage of the analyzer, or provided in both the pre-stage and the post-stage of the analyzer, so as to form an ion mobility and mass-to-charge ratio hybrid analyzer.

In an embodiment of the present invention, one of the first drift/analyzer region and the second drift/analyzer region is used as a first ion mobility filter allowing ions with mobilities higher than a first preset mobility to pass; and/or the other of the first drift/analyzer region and the second drift/analyzer region is used as a second ion mobility filter allowing ions with mobilities lower than a second preset mobility to pass.

In an embodiment of the present invention, the first preset mobility is less than the second preset mobility.

In an embodiment of the present invention, one of the first drift/analyzer region and the second drift/analyzer region is used as an ion mobility analyzer, which comprises a direct current electric field that varies with time so that ions having different ion mobilities pass through the analyzer region in different periods of time; and the other of the first drift/analyzer region and the second drift/analyzer region is used as an ion transfer and/or accumulation channel.

In an embodiment of the present invention, the first direct current electric field of the first drift/analyzer region scans with time so that ions having different ion mobilities pass in different periods of time and enter the second drift/analyzer region through the connection region, and the second direct current electric field of the second drift/analyzer region causes all ions to pass through the second drift/analyzer region to the detector.

In an embodiment of the present invention, the first direct current electric field of the first drift/analyzer region is a nonlinear direct current electric field so that ions are accumulated in at least a partial area of the first drift/analyzer region, the first direct current electric field varies with time so that ions pass through the first drift/analyzer region and enter the second drift/analyzer region through the connection region, and the second direct current electric field of the second drift/analyzer region scans with time so that ions having different ion mobilities pass through the second drift/analyzer region in different periods of time to the detector.

In an embodiment of the present invention, the first direct current electric field of the first drift/analyzer region causes all ions to pass through the first drift/analyzer region and enter the second drift/analyzer region through the connection region, and the second direct current electric field of the second drift/analyzer region scans with time so that ions having different ion mobilities pass through the second drift/analyzer region in different periods of time to the detector.

In an embodiment of the present invention, the direct current electric fields of the first drift/analyzer region, the second drift/analyzer region, and the third drift/analyzer region cause ions to pass through the first drift/analyzer region, the connection region and the second drift/analyzer region along a direction perpendicular to the gas flow direction to the detector.

In an embodiment of the present invention, the direct current electric fields of the first drift/analyzer region, the second drift/analyzer region, and the third drift/analyzer region cause ions to pass through the first drift/analyzer region, the connection region and the second drift/analyzer region along a direction parallel to the gas flow direction to the detector.

To achieve the above object and other related objects, the present invention further provides an ion mobility analysis method for separating and identifying ionic analytes, comprising: providing an ion source for generating ions; providing a first drift/analyzer region provided with an ions entrance connected to the ion source, wherein the first drift/analyzer region comprises a first direct current electric field and a first gas flow, wherein the first direct current electric field and the first gas flow cause ions to move along an axis of the first drift/analyzer region, and wherein the first direct current electric field and the first gas flow apply opposing forces on ions; providing a second drift/analyzer region provided with an ions exit, wherein the second drift/analyzer region comprises a second direct current electric field and a second gas flow, wherein the second direct current electric field and the second gas flow cause ions to move along an axis of the second drift/analyzer region, wherein the second direct current electric field and the second gas flow apply opposing forces on ions, and the second gas flow has the same gas flow direction as the first gas flow; providing a connection region located between the first drift/analyzer region and the second drift/analyzer region, wherein the connection region comprises a third direct current electric field that causes ions to transfer from the first drift/analyzer region to the second drift/analyzer region; and providing a detector connected to the ion exit.

In an embodiment of the present invention, the ion mobility analysis method comprises: introducing ions from the ion entrance along a direction perpendicular to the gas flow direction; and/or ejection ions from the ion exit along a direction perpendicular to the gas flow direction.

In an embodiment of the present invention, the ion mobility analysis method comprises: by controlling the direct current electric fields, using one of the first drift/analyzer region and the second drift/analyzer region as a first ion mobility filter allowing ions having mobilities higher than a first preset mobility to pass; and/or using the other of the first drift/analyzer region and the second drift/analyzer region as a second ion mobility filter allowing ions having mobilities lower than a second preset mobility to pass.

In an embodiment of the present invention, the ion mobility analysis method comprises: using one of the first drift/analyzer region and the second drift/analyzer region, of which the direct current electric field varies with time, as an ion mobility analyzer so that ions having different ion mobilities pass through the ion mobility analyzer in different periods of time, and using the other of the first drift/analyzer region and the second drift/analyzer region as an ion transfer and/or accumulation channel.

In an embodiment of the present invention, the ion mobility analysis method comprises: controlling the direct current electric fields of the first drift/analyzer region, the second drift/analyzer region and the connection region to cause ions to pass through the first drift/analyzer region, the connection region and the second drift/analyzer region along a direction perpendicular to the gas flow direction to the detector.

As described above, the present invention provides an ion mobility analyzer and analysis method. The analyzer comprises: a first drift/analyzer region provided with an ions entrance, a second drift/analyzer region provided with an ions exit, a connection region connecting the first drift/analyzer region and the second drift/analyzer region, and a detector connected to the ion exit, wherein direct current electric fields and gas flows in the first drift/analyzer region and the second drift/analyzer region apply opposing forces on ions, and the second gas flow has the same flow direction as the first gas flow. The connection region comprises a third direct current electric field that causes ions to transfer from the first drift/analyzer region to the second drift/analyzer region. The first region and the second region have the same gas flow direction to avoid turbulence. Therefore, the present invention achieves stable resolution and sensitivity either as a high-resolution ion mobility analyzer or as an ion mobility filter for a continuous ion beam.

DETAILED DESCRIPTION OF THE INVENTION

Implementation modes of the present invention are illustrated below through specific embodiments. Those skilled in the art can easily understand other advantages and efficacies of the present invention according to the contents disclosed in this specification.

Refer to the accompanying drawings of the specification of the present invention. It should be noted that the structures, scales, sizes and the like drawn in the accompanying drawings of this specification are all merely used to cooperate with the content disclosed in the specification so as to help those skilled in the art understand and read the content, but are not used to define limiting conditions for implementing the present invention and therefore do not have any substantial technical meanings. Any modifications on the structures, changes in the scale relations or adjustment in the sizes that do not affect the efficacies and objects of the present invention should still fall within the scope covered by the technical content disclosed by the present invention. Meanwhile, terms such as "upper", "lower", "left", "right", "middle" and "one" mentioned in this specification are merely used for the clarity of the description, and are not intended to limit the implementation scope of the present invention. Changes or adjustments in relative relations thereof without changing the technical contents substantially should also be considered as the implementation scope of the present invention.

Figure 1A:
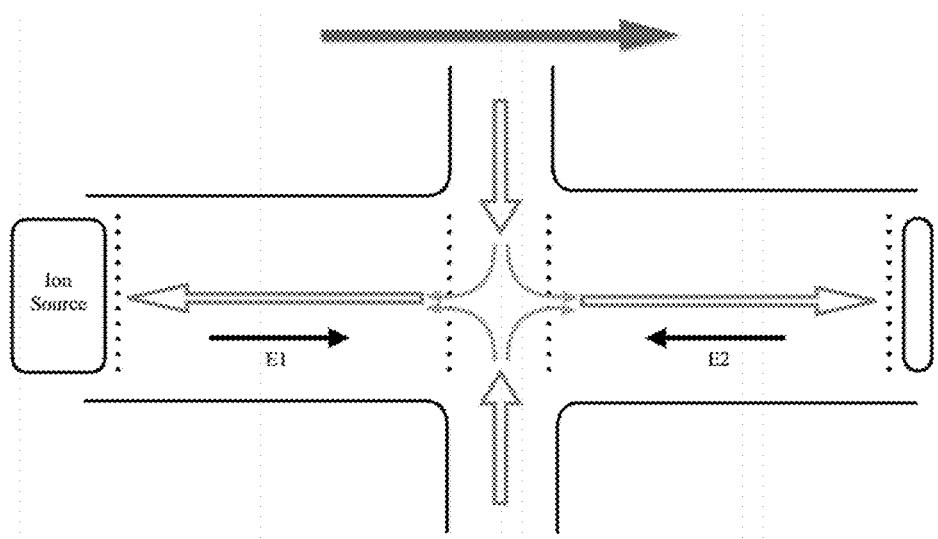
FIG. 1A is a schematic diagram of a Hashimoto ion mobility filter in the prior art.
Figure 1B:
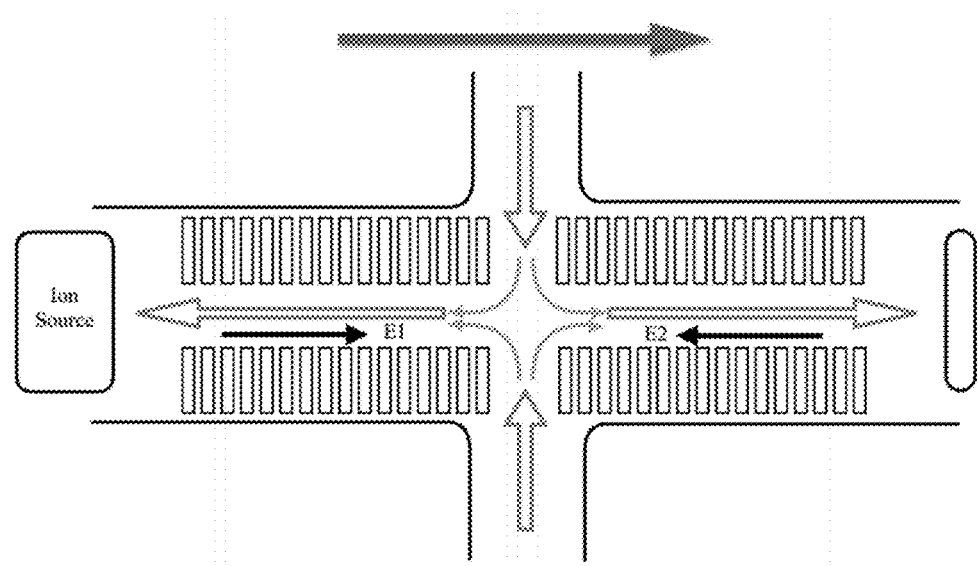
FIG. 1B is a schematic diagram of a Parks mobility filter in the prior art.
Figure 2A:
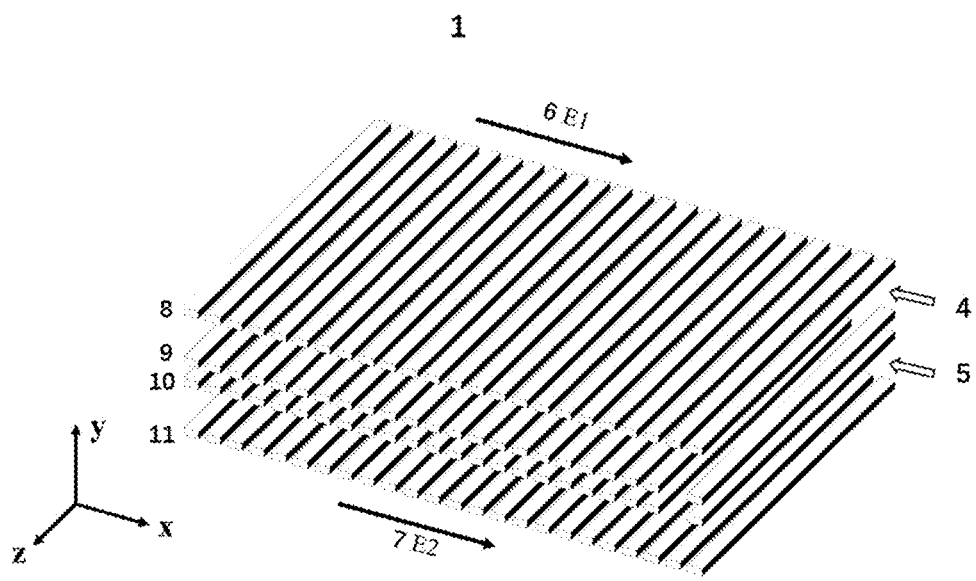
FIG. 2A is a schematic diagram of an ion mobility analyzer consistent with the present invention.

FIG. 2A is a schematic structural diagram of an ion mobility analyzer 1 consistent with the present invention. The present invention provides four groups of electrodes: electrode assemblies 8, 9, 10, and 11. Electrodes in each assembly are arranged parallel in the same plane, and the planes in which the four electrode assemblies are located parallel to each other. A gas flow 4 exists between the electrode assemblies 8 and 9, and a gas flow 5 exists between the electrode assemblies 10 and 11. The gas flows 4 and 5 have the same direction. A direct current electric field 6 in a direction opposite to that of the gas flow 4 is applied on the electrode assemblies 8 and 9; a direct current electric field 7 in a direction opposite to that of the gas flow 5 is applied on the electrode assemblies 10 and 11. More details are shown in FIG. 2B.

Figure 2B:
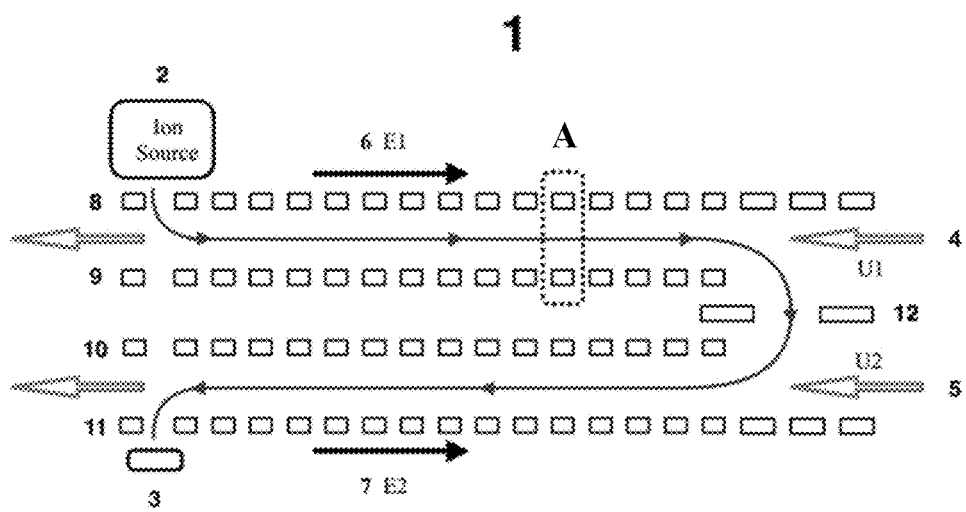
FIG. 2B is a schematic diagram of an xy plane of an ion mobility analyzer consistent with the present invention.

FIG. 2B is a schematic structural diagram of an xy plane of the ion mobility analyzer 1 consistent with the present invention. An ion source 2 is disposed outside an ion entrance of the ion mobility analyzer 1. A detector 3 is disposed outside an exit of the ion mobility analyzer 1. Two rows of parallel electrode assemblies 8 and 9 form a first drift/analyzer region, and two rows of parallel electrode assemblies 10 and 11 form a second drift/analyzer region. Each electrode assembly 8, 9, 10, 11 comprises a plurality of electrodes distributed along an axis.

Electrodes at tail ends of the parallel electrode assemblies 9, 10 and an electrode assembly 12 form a connection region, to connect the first drift/analyzer region and the second drift/analyzer region. Especially, when the distance between the parallel electrode assemblies 9 and 10 is small, electrodes at tail ends of the parallel electrode assemblies 9 and 10 form the connection region.

In the first drift/analyzer region, a linear or nonlinear first direct current electric field 6 E1 can be applied on the electrode assemblies 8 and 9. The arrow at E1 in the figure represents the direction of a force applied by the first direct current electric field on ions. Moreover, there is a first gas flow 4 U1 flowing through the first drift/analyzer region, and the direction of the force applied by the first gas flow 4 U1 on ions is opposite to the direction of the first direct current electric field.

Moreover, in the second drift/analyzer region, a linear or nonlinear first direct current electric field 7 E2 is applied on the electrode assemblies 10 and 11. There is a second gas flow 5 U2 in the second drift/analyzer region. The direction of the force applied by the second gas flow 5 U2 on ions is opposite to the direction of the direct current electric field, and is the same as the direction of the first gas flow 4 in the first drift/analyzer region.

A direct current electric field is applied in the connection region so that ions are transferred from the first drift/analyzer region to the second drift/analyzer region. In addition, radio frequency voltages are added on the electrode assemblies 8, 9, 10 and 11 to confine ions in a radial direction perpendicular to the axes.

For example, as shown in FIG. 2, the electrodes in each of the first drift/analyzer region and the second drift/analyzer region form a plurality of electrode pairs (one electrode pair is marked in block A in the figure) arranged along the axis, Each electrode pair comprises two electrodes located in the same plane, and the plane is perpendicular to the axis. Radio frequency voltages with different phases are applied on adjacent electrode pairs respectively to form, in a direction perpendicular to the gas flow, a quadrupole field or a multipole field for confining ions.

And/or, in other embodiments, the electrodes in each of the first drift/analyzer region and the second drift/analyzer region form a plurality of electrode unit pairs arranged along the axis. Each of the plurality of electrode unit pairs comprises two electrode units located in the same plane, and the plane is perpendicular to the axis. Each electrode unit comprises a plurality of segmented electrodes distributed along a radial direction perpendicular to the axis, Radio frequency voltages with different phases are applied on adjacent segmented electrodes to form, in a direction parallel to the gas flow, a quadrupole field or a multipole field for confining ions.

And/or, a segment of the second drift/analyzer region close to the detector comprises a plurality of electrodes, and voltages are applied on each of the plurality of electrodes to form an electric field for confining ions and focusing ions to the detector during transfer.

In the foregoing examples, there are many structures that can confine ions by applying radio frequency voltages on electrodes, and add direct current voltages on electrodes to form a direct current electric field so as to implement radial ion deflection or focusing. Therefore, the specific implementation thereof is not described in detail herein.

As shown in FIG. 2, in the three regions, ions represent a U-shaped ion trajectory 13 under the combined effect of the electric fields and the gas flow fields. In the first drift/analyzer region, the first direct current electric field applies a stronger force on ions than the gas flow field, thereby pushing the ions to the connection region. In the second drift/analyzer region, the gas flow field applies a stronger force on ions than the second direct current electric field, thereby pushing the ions to the detector 3 for detection.

Figure 3:
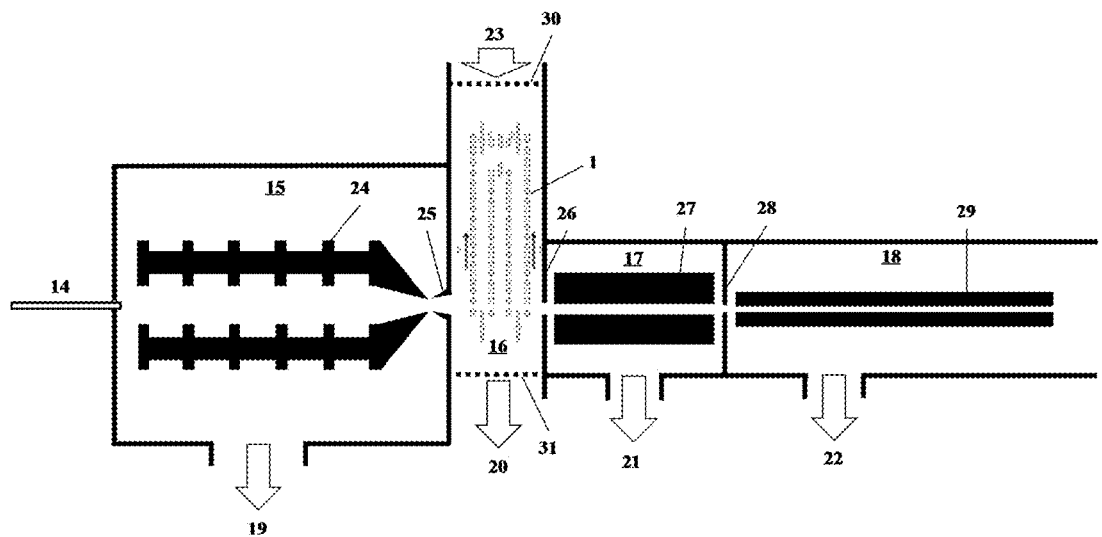
FIG. 3 is a diagram showing a relationship between an ion mobility analyzer and its pre-stage vacuum system as well as post-stage vacuum system consistent with the present invention.

FIG. 3 is a diagram showing a relationship between the ion mobility analyzer consistent with the present invention and its pre-stage vacuum system as well as post-stage vacuum system. One mass spectrometer has multiple stages of vacuum regions from the atmosphere of the ion source to $10^{-6}$ Torr high vacuum of the mass analyzer. Ions are generated from the ion source and enter a first-stage vacuum region 15 through a capillary 14. The ions in the first-stage vacuum region 15 are focused by a radio frequency ion guiding apparatus 24, and then enter a second-stage vacuum region 16 through a skimmer 25. The ion mobility analyzer 1 of the present invention is disposed in a second-stage vacuum region 16. The second-stage vacuum region 16 has a vacuum pressure ranging from 2 to 4 Torr. The ions enter a third-stage vacuum region 17 through the ion mobility analyzer 1. A second ion guiding apparatus 27 is disposed in the third-stage vacuum region 17. The third-stage vacuum region 17 is followed by a fourth-stage vacuum region 18 where a mass analyzer 29 is located. The mass analyzer 29 may be a triple quadrupole mass analyzer, a Q-TOF mass analyzer, or the like. Vacuum regions of adjacent stages are connected by using orifices 26 and 28. The vacuum region of each stage is connected to a pump to maintain vacuum. The second-stage vacuum region 16 where the ion mobility analyzer is located comprises a gas introducing apparatus 23 to introduce pure mobility analysis buffering gas. Gas flow shaping apparatus are further disposed at an entrance and an exit of the second-stage vacuum region 16 so that the gas flows in the ion mobility analyzer are laminar flows.

Figure 4A:
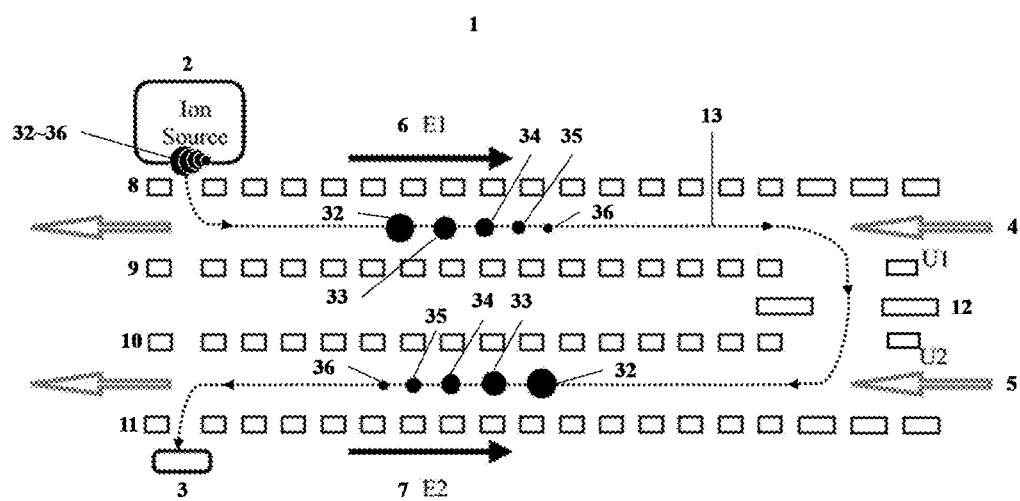
FIG. 4A is a schematic structural diagram of a first embodiment of an ion mobility analyzer consistent with the present invention.

FIG. 4A is a schematic diagram of a first embodiment of an ion mobility analyzer consistent with the present invention. In the first embodiment of the present invention, the first ion drift/analyzer region is used as a high-resolution scan-type ion mobility analyzer with a high ion capacity, and the second ion drift/analyzer region is used for transferring ions to the detector 3. A nonlinear first direct current electric field 6 E1 whose direction is opposite to the direction of the first gas flow 4 U1 is applied on the electrode assemblies 8 and 9. And ions 32, 33, 34, 35 and 36 with different ion mobilities $K_1$ to $K_5$ are separated in the first drift/analyzer region. A second direct current electric field 7 E2 whose direction is opposite to the direction of the second gas flow 5 U2 is applied on the electrode assemblies 10 and 11, and ions are transferred to the detector 3.

The ion analysis performed in this embodiment comprises three analysis steps: accumulation, trapping and elution.

Figure 4B:
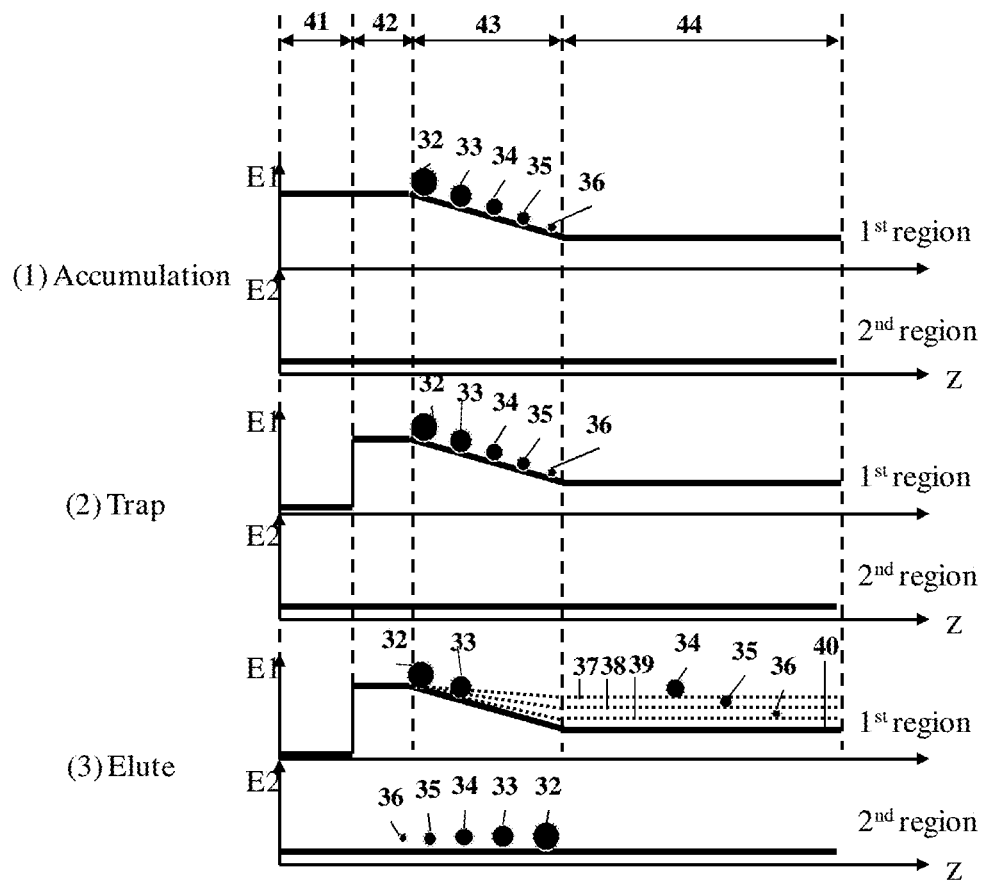
FIG. 4B is a schematic diagram of electric field distribution in an analysis process in the first embodiment of the ion mobility analyzer consistent with the present invention.
Figure 4C:
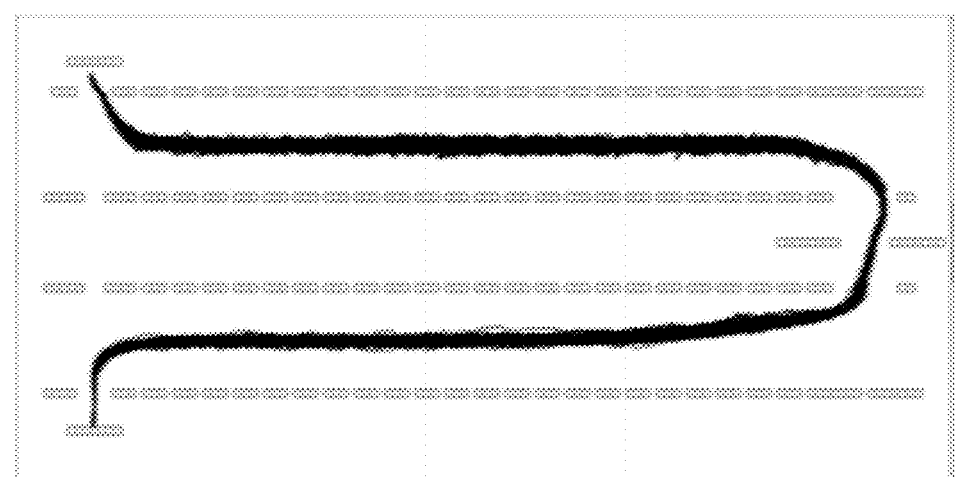
FIG. 4C is an ion trajectory simulation diagram of the first embodiment of the ion mobility analyzer consistent with the present invention.

The electric field distribution varies in the three analysis steps, as shown in FIG. 4B. In this embodiment, the electric field distribution in the first drift/analyzer region (1st region) can be divided into four areas: an ion injection area 41, an ion transfer area 42, an electric field gradient decreasing edge area 43 and a flat area 44. Ions are first continuously introduced into the first drift/analyzer region, and pushed by the high electric field, all the ions enter the electric field gradient decreasing edge area 43 through the areas 41 and 42. In the area 43, different electric gradients will hold ions with different mobility K balanced with gas flow velocity at different equilibrium positions. An equilibrium condition is KE=U, wherein K represents an ion mobility, E represents an electric field gradient, and U represents a gas flow speed. Assuming that the gas flow speed U is a constant, ions having a high mobility will be trapped at a position with a low electric field gradient, that is, as shown in (1) Accumulation step in the figure. As shown in (2) Trap step in the figure, after a fixed accumulation time, the electric field gradient of the ion injection area 41 is decreased to a very low value so that no ions can enter the first drift/analyzer region. Ions will be trapped and cooled by collisions during a user-defined time in electric gradient decreasing edge area 43. The magnitude of the electric fields in electric gradient decreasing edge area 43 and the flat area 44 are increased at a scan speed β from an initial electric gradient $E_0$ during the elute step. As shown in (3) Elute step in the figure, ions will be eluted successively from high mobility $K_5$ to low mobility $K_1$ with the increasing of the electric gradient, ions will pass through the connection region and the second drift/analyzer region to the detector 3. In this process, the electric field E2 of the second drift/analyzer region (2nd region) remains unchanged. FIG. 4C is an ion trajectory simulation diagram of this embodiment.

Figure 5A:
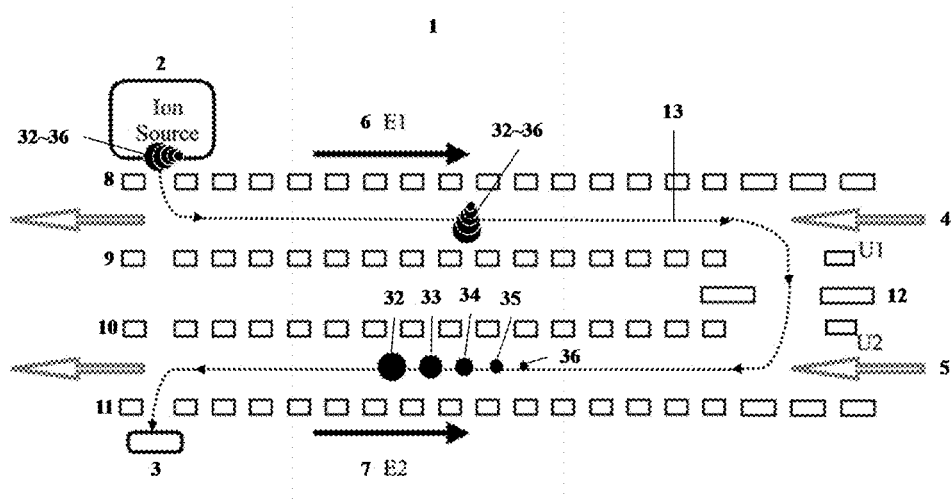
FIG. 5A is a schematic structural diagram of a second embodiment of an ion mobility analyzer consistent with the present invention.
Figure 5B:
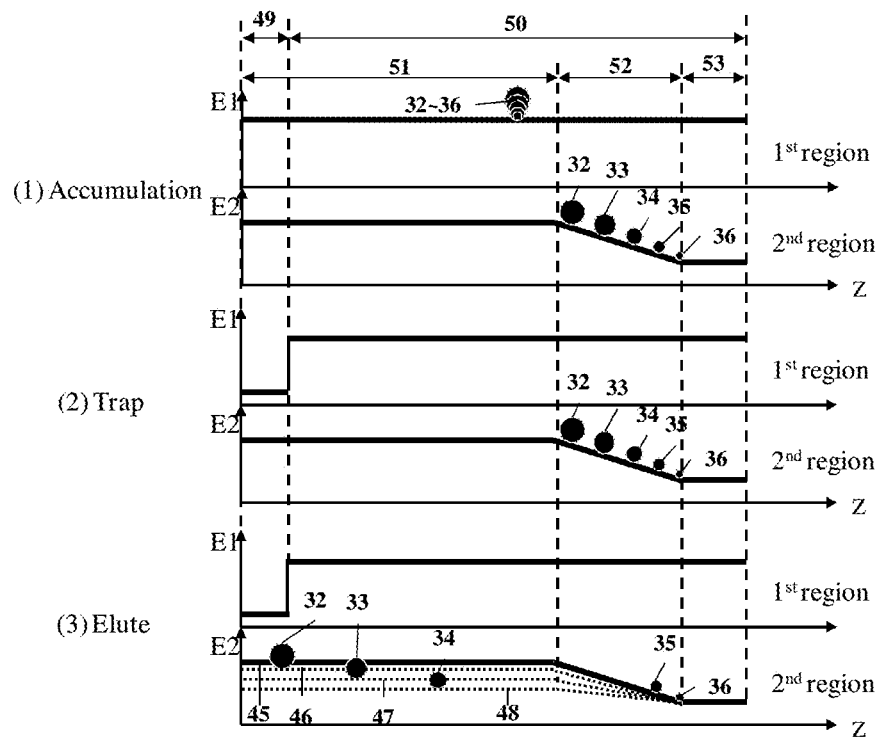
FIG. 5B is a schematic diagram of electric field distribution in an analysis process in the second embodiment of the ion mobility analyzer consistent with the present invention.
Figure 5C:
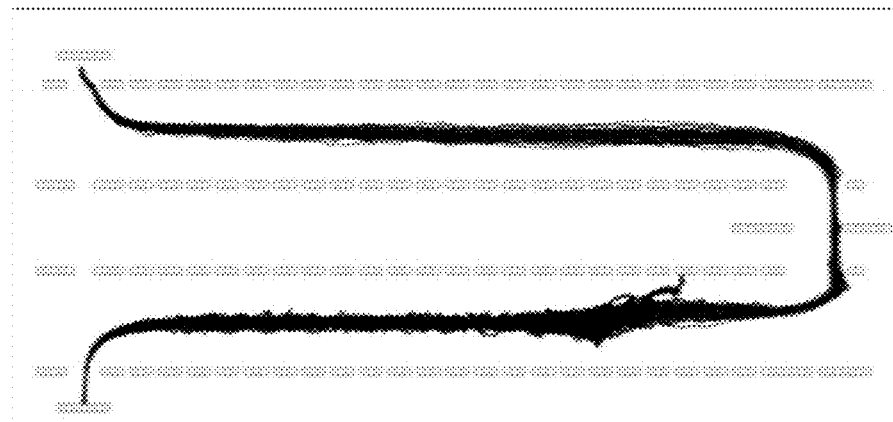
FIG. 5C is an ion trajectory simulation diagram of the second embodiment of the ion mobility analyzer consistent with the present invention.

FIG. 5A is a schematic diagram of a second embodiment of the present invention. In this embodiment, the first ion drift/analyzer region is used for accumulating and transferring ions, and the second ion drift/analyzer region is used as a high-resolution mobility analyzer. A direct current electric field whose direction is opposite to the direction of the gas flow 4 U1 is applied on the electrode assemblies 8 and 9 so that ions are accumulated in the first drift/analyzer region and transferred to the connection region. A nonlinear direct current electric field whose direction is opposite to the direction of the gas flow 5 U2 is applied on the electrode assemblies 10 and 11 so that ions 32 to 36 having different mobilities (from $K_1$ to $K_5$) are separated in the second drift/analyzer region. The gas flows 4 U1 and 5 U2 have the same direction. The electric field distribution is shown in FIG. 5B. The analysis process of this embodiment also comprises three steps: accumulation, trapping and elution. The electric field distribution in the first drift/analyzer region can be divided into two parts: an ion injection area 49 and an ion accumulation area 50. The electric field distribution in the second drift/analyzer region can be divided into three parts: an ion transfer area 53, an electric field increasing area 52 and a plateau area 51. Ions are first continuously injected into the first drift/analyzer region, and pushed by the high electric field, all the ions enter the electric field intensity rising area 52 through the areas 49, 50 and 53. Under the combined effect of the gas flow and the electric field, ions having different mobilities achieve equilibrium at positions with different electric field. After a fixed accumulation time, the electric field of the ion injection area 49 is decreased to a very low value so that no ions can enter the first drift/analyzer region. The ions entering the region previously achieve equilibrium in the electric field increasing edge area 52 after collision cooling. After a period of time, the electric field of the electric field increasing edge area 52 and the plateau area 51 slowly decreases from an initial value $E_0$ at a particular speed of β (the electric field decreases gradually as indicated by 45 to 48). Ions will be eluted from low mobility $K_1$ to high mobility $K_5$ with the decreasing of the electric field. FIG. 5C is an ion trajectory simulation diagram of this embodiment.

Figure 6A:
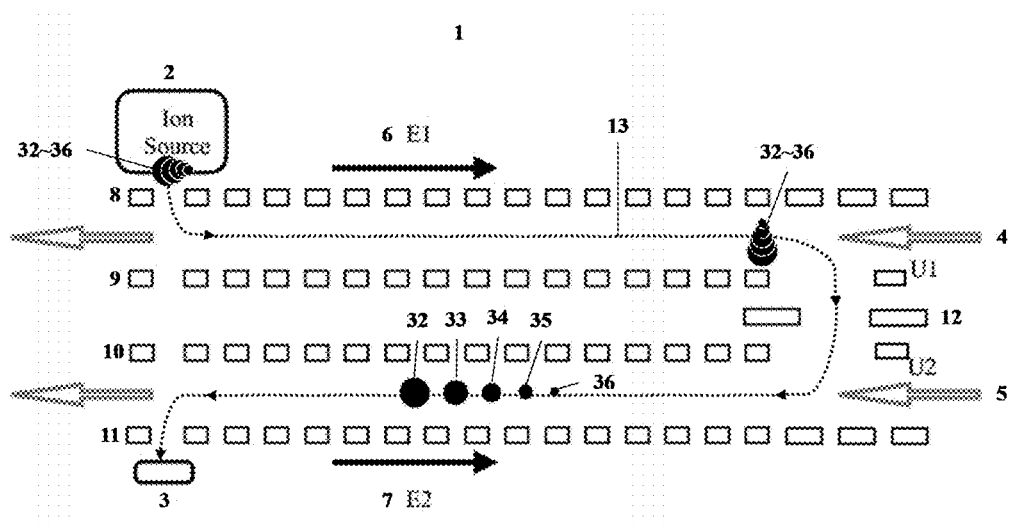
FIG. 6A is a schematic structural diagram of a third embodiment of an ion mobility analyzer consistent with the present invention.
Figure 6B:
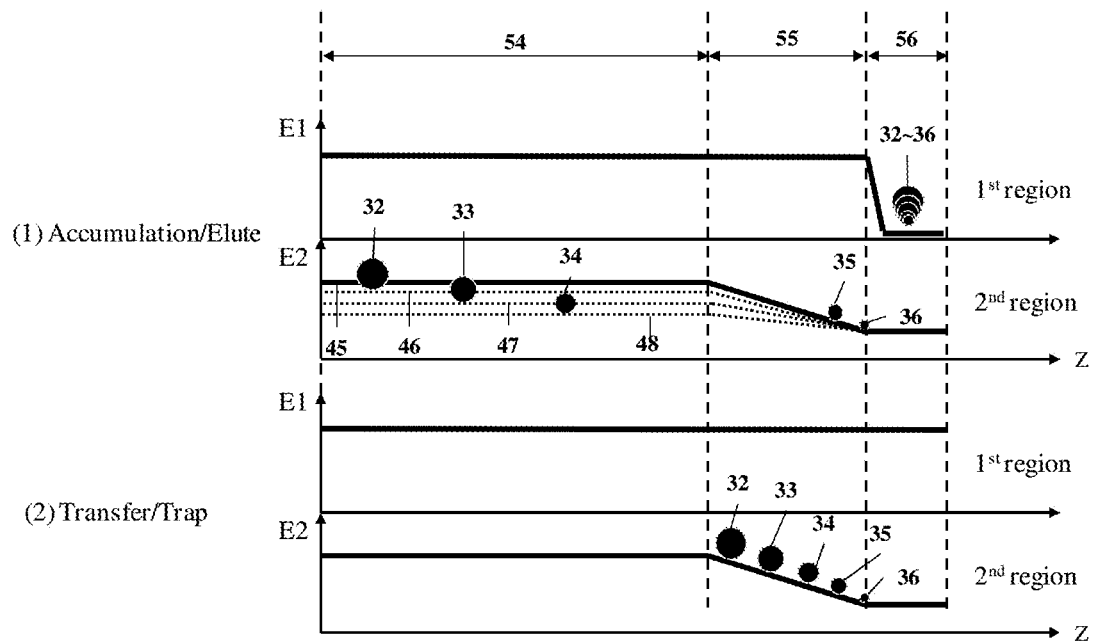
FIG. 6B is a schematic diagram of electric field distribution in an analysis process in the third embodiment of the ion mobility analyzer consistent with the present invention.

FIG. 6A is a schematic diagram of a third embodiment of the present invention. In this embodiment, the first drift/analyzer region is used for transferring ions, and ions are accumulated at positions near the connection region. The second drift/analyzer region is used as a high-resolution mobility analyzer. This embodiment differs from the foregoing embodiments in that the analysis in this embodiment only comprises two steps: accumulation/elution and transfer/trapping. Accumulation and elution are carried out simultaneously in two different drift/analyzer regions. Transfer and trapping are also carried out simultaneously in two different drift/analyzer regions. The electric field distribution is shown in FIG. 6B. In this embodiment, the second drift/analyzer region can be divided into three parts: an ion transfer area 56, an electric field rising edge area 55 and a plateau area 54. Ions 32 to 36 are first accumulated at the tail end of the first drift/analyzer region. After accumulation for a period of time, the ions are transferred to the second drift/analyzer region through the connection region, and are trapped in the electric field rising edge area 55 of the second drift/analyzer region to achieve equilibrium. After a period of time, the electric field of the electric field intensity rising edge area 55 and the plateau area 54 slowly decreases from an initial value $E_0$ at a particular speed of β (the electric field intensity decreases gradually as indicated by 45 to 48). Ions will be eluted from low mobility $K_1$ to high mobility $K_5$ with the decreasing of the electric field. At the same time, ions are accumulated in the first drift/analyzer region. As described above, in this embodiment, accumulation and elution are carried out simultaneously in two different drift/analyzer regions; transfer and trapping are also carried out simultaneously in two different drift/analyzer regions. The duty cycle is close to 100% in this embodiment.

Figure 7A:
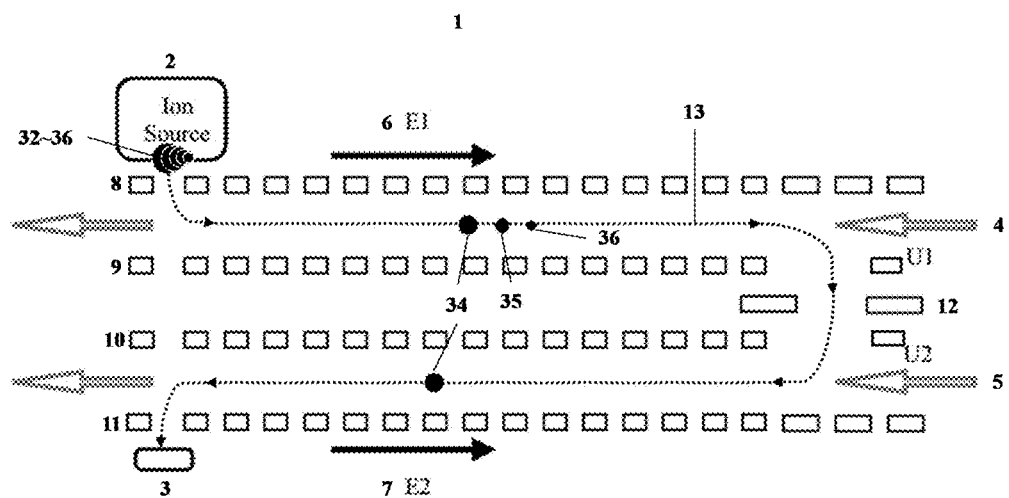
FIG. 7A is a schematic structural diagram of a fourth embodiment of an ion mobility analyzer consistent with the present invention.
Figure 7B:
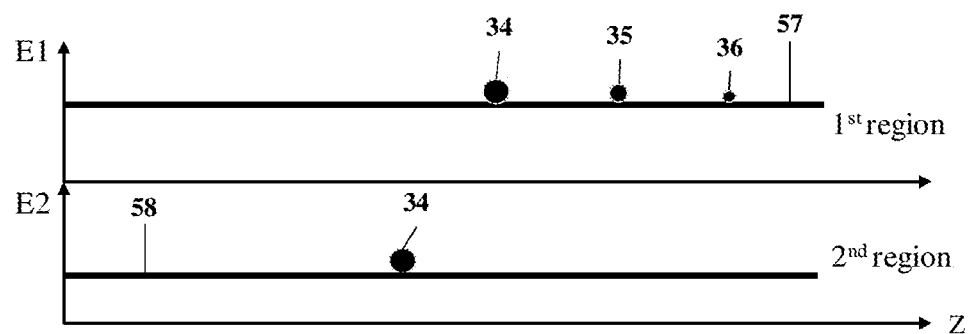
FIG. 7B is a schematic diagram of electric field distribution in an analysis process in the fourth embodiment of the ion mobility analyzer consistent with the present invention.
Figure 7C:
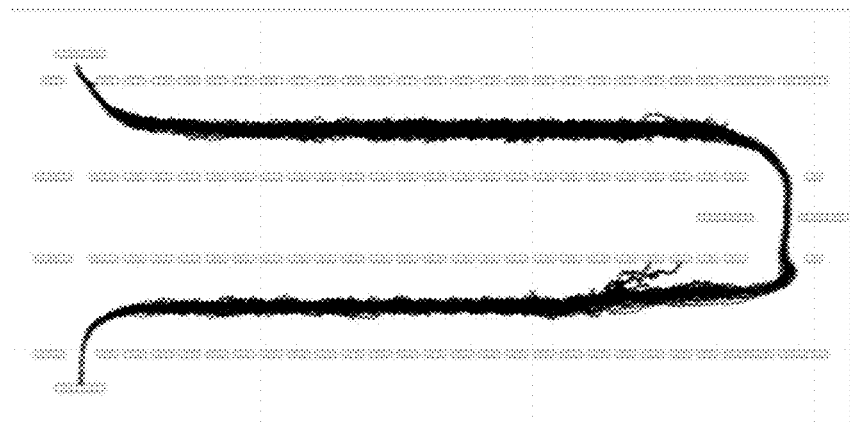
FIG. 7C is an ion trajectory simulation diagram of the fourth embodiment of the ion mobility analyzer consistent with the present invention.

FIG. 7A is a schematic diagram of a fourth embodiment of the present invention. In this embodiment, the first drift/analyzer region is used as a "high pass" (that is, ion mobilities are higher than a first preset ion mobility) mobility filter, the second drift/analyzer region is used as a "low pass" (that is, ion mobilities are lower than a second preset ion mobility) mobility filter, and the connection region is used as an ion transfer channel. This embodiment is used for target mobility analysis. An electric field E1 whose direction is opposite to the direction of the gas flow 4 U1 is applied on the electrode assemblies 8 and 9 so that ions having ion mobilities greater than U1/E1 pass through the first drift/analyzer region. An electric field E2 whose direction is opposite to the direction of the gas flow 5 U2 is applied on the parallel electrode assemblies 10 and 11 so that ions having ion mobilities lower than U2/E2 pass through the second drift/analyzer region to the detector 3. The gas flows 4 U1 and 5 U2 have the same direction. The electric field distribution is shown in FIG. 7B. The electric field of the first drift/analyzer region is 57, and the electric field of the second drift/analyzer is 58. The electric field 57 of the first drift/analyzer region causes ions 34, 35 and 36 whose mobilities are greater than $K_2$ to pass through. The electric field 58 of the second drift/analyzer region causes an ion 34 whose mobility is less than $K_4$ to pass through this region to the detector. The result of this embodiment is obtaining a continuous ion beam having a certain mobility range. FIG. 7C is an ion trajectory simulation diagram of this embodiment.

Figure 8A:
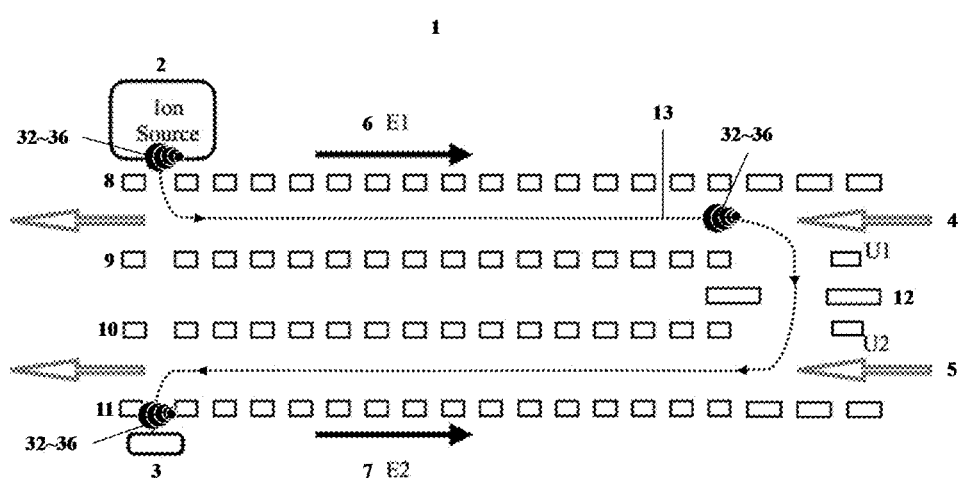
FIG. 8A is a schematic structural diagram of a fifth embodiment of an ion mobility analyzer consistent with the present invention.
Figure 8B:
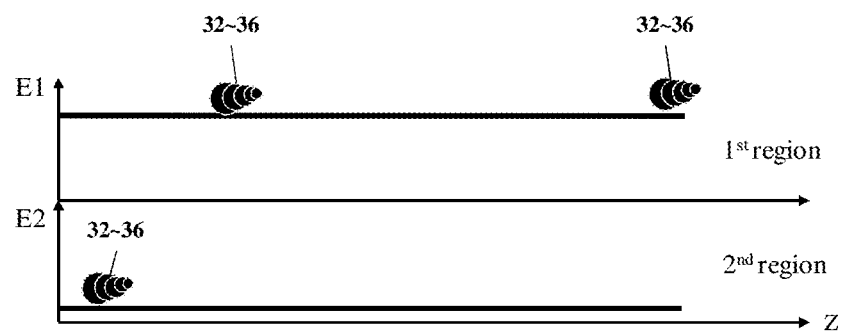
FIG. 8B is a schematic diagram of electric field distribution in an analysis process in the fifth embodiment of the ion mobility analyzer consistent with the present invention.
Figure 8C:
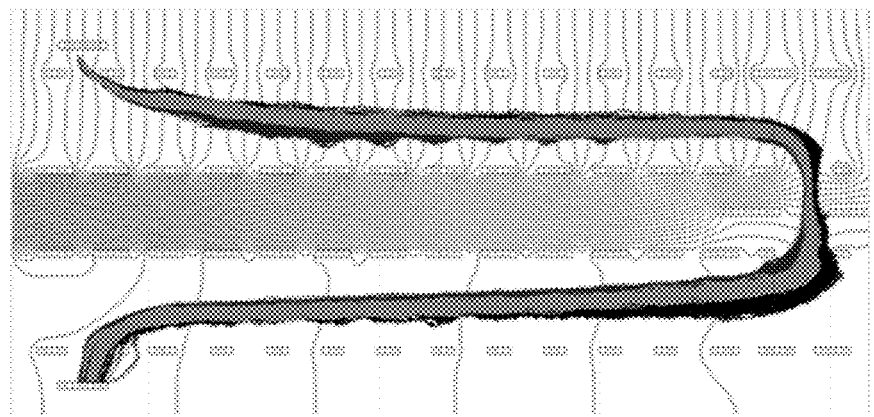
FIG. 8C is an ion trajectory simulation diagram of the fifth embodiment of the ion mobility analyzer consistent with the present invention.

FIG. 8A is a schematic diagram of a fifth embodiment of the present invention. In this embodiment, all ions are transferred from the ion source 2 to the detector 3 through three regions. A high electric field E1 whose direction is opposite to the direction of the gas flow 4 U1 is applied on the electrode assemblies 8 and 9 so that all the ions 32 to 36 pass through the first drift/analyzer region. A low electric field E2 whose direction is opposite to the direction of the gas flow 5 U2 is applied on the electrode assemblies 10 and 11 so that all the ions 32 to 36 pass through the second drift/analyzer region to the detector 3. The electric field distribution in this embodiment is shown in FIG. 8B. FIG. 8C is an ion trajectory simulation diagram of this embodiment. The simulation result shows that the ion transmission efficiency is near 100%.

Figure 9A:
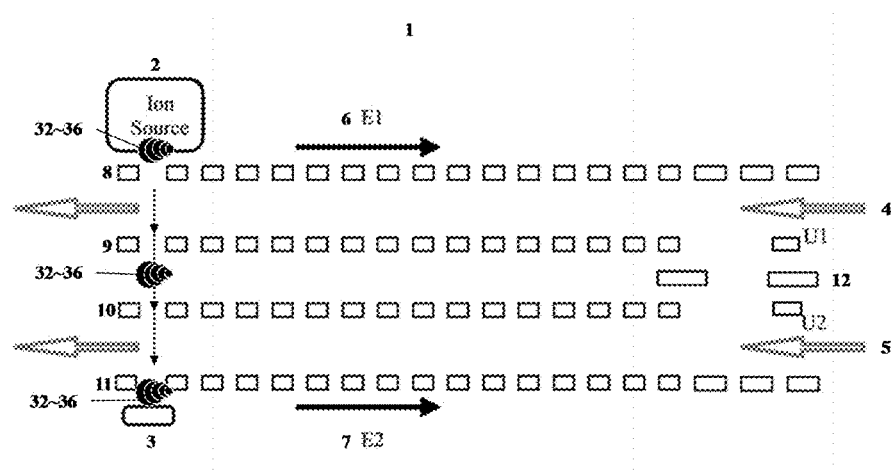
FIG. 9A is a schematic structural diagram of a sixth embodiment of an ion mobility analyzer consistent with the present invention.
Figure 9B:
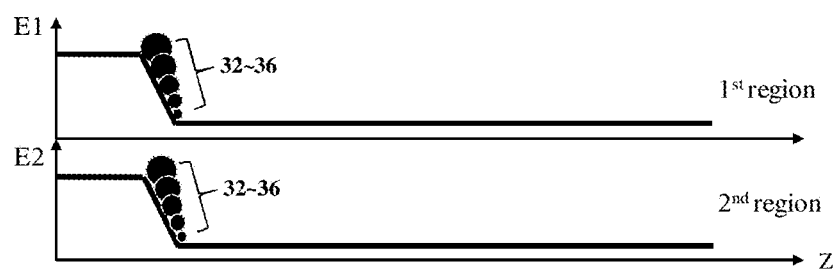
FIG. 9B is a schematic diagram of electric field distribution in an analysis process in the sixth embodiment of the ion mobility analyzer consistent with the present invention.
Figure 9C:
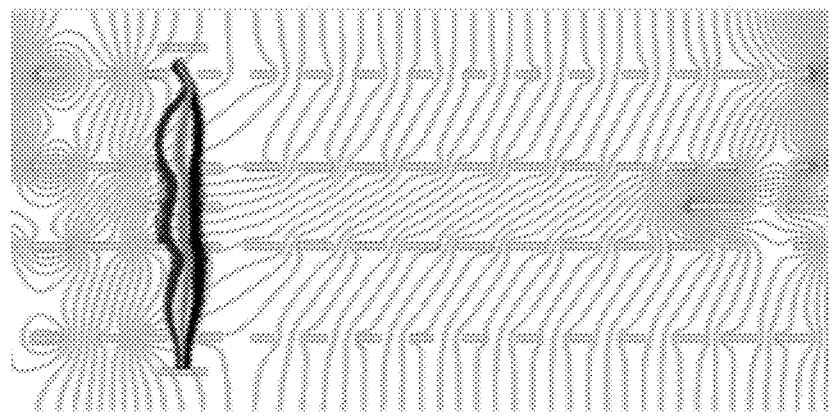
FIG. 9C is an ion trajectory simulation diagram of the sixth embodiment of the ion mobility analyzer consistent with the present invention.

FIG. 9A is a schematic diagram of a sixth embodiment of the present invention. In this embodiment, all ions are transferred from the ion source 2 to the detector 3 though three regions along a direction perpendicular to the directions of the gas flows U1 and U2. Nonlinear direct current electric fields E1 and E2 whose directions are opposite to the directions of the gas flows 4 U1 and 5 U2, are applied on the electrode assemblies 8, 9, 10 and 11, so that the ions are transferred from the ion source to the detector along a direction perpendicular to that of the gas flows. The electric field distribution in this embodiment is shown in FIG. 9B. FIG. 9C is an ion trajectory simulation diagram of this embodiment. The simulation result shows that the ion transmission efficiency is near 100%. In addition, the retention time is also very short (about 100 us).

In conclusion, the present invention provides an ion mobility analyzer and analysis method. The analyzer comprises: a first drift/analyzer region provided with an ions entrance, a second drift/analyzer region provided with an ions exit, a connection region connecting the first drift/analyzer region and the second drift/analyzer region, and a detector connected to the ion exit, wherein direct current electric fields and gas flows in the first drift/analyzer region and the second drift/analyzer region apply opposing forces on ions, and the second gas flow has the same gas flow direction as the first gas flow. The connection region comprises a third direct current electric field that causes ions to transfer from the first drift/analyzer region to the second drift/analyzer region. The first region and the second region have the same gas flow direction to avoid turbulence. Therefore, the present invention achieves stable resolution and sensitivity either as a high-resolution ion mobility analyzer or as an ion mobility filter for a continuous ion beam.

The present invention effectively overcomes various disadvantages in the prior art and hence has high industrial utility value.

1. The above-mentioned embodiments are just used for exemplarily describing the principle and effects of the present invention instead of limiting the present invention. One skilled in the art can make modifications or changes to the above-mentioned embodiments without going against the spirit and the range of the present invention. Therefore, all equivalent modifications or changes made by those who have common knowledge in the art without departing from the spirit and technical concept disclosed by the present invention shall be still covered by the claims of the present invention.

What is claimed is:

1. An ion mobility analyzer, comprising: a first electrode assembly, a second electrode assembly, a third electrode assembly, and a fourth electrode assembly located in planes parallel to each other, each electrode assembly comprises a plurality of electrodes distributed along an axis in a same plane, wherein the analyzer comprises:
   an ion source;
   a first drift/analyzer region, constituted by the first electrode assembly and the second electrode assembly, the first drift/analyzer region is provided with an ion entrance connected to the ion source, wherein the first drift/analyzer region comprises a first direct current electric field and a first gas flow, wherein the first direct current electric field and the first gas flow cause ions to move along an axis of the first drift/analyzer region, and wherein the first direct current electric field and the first gas flow apply opposing forces on ions;
   a second drift/analyzer region, constituted by the third electrode assembly and the fourth electrode assembly, the second drift/analyzer region is provided with an ion exit, wherein the second drift/analyzer region comprises a second direct current electric field and a second gas flow, wherein the second direct current electric field and the second gas flow cause ions to move along an axis of the second drift/analyzer region, wherein the second direct current electric field and the second gas flow apply opposing forces on ions, and the second gas flow has the same gas flow direction as the first gas flow;
   a connection region located between the first drift/analyzer region and the second drift/analyzer region, the connection region is constituted between electrodes at tail ends of the second electrode assembly and the third electrode assembly and a fifth electrode assembly, to connect the first drift/analyzer region and the second drift/analyzer region, wherein the connection region comprises a third direct current electric field that causes ions to transfer from the first drift/analyzer region to the second drift/analyzer region; and
   a detector connected to the ion exit;
   wherein an ion injection direction of the ion entrance is perpendicular to the gas flow direction, and an ion ejection direction of the ion exit is perpendicular to the gas flow direction.

2. The ion mobility analyzer as in claim 1, wherein the first gas flow and the second gas flow are laminar flows.

3. The ion mobility analyzer as in claim 1, wherein the ion source is located upstream or downstream of the gas flows.

4. The ion mobility analyzer as in claim 1, wherein the detector is located upstream or downstream of the gas flows.

5. The ion mobility analyzer as in claim 1, wherein the axis of the second drift/analyzer region is on a line different from that of the axis of the first drift/analyzer region.

6. The ion mobility analyzer as in claim 5, wherein the axis of the second drift/analyzer region is parallel to the axis of the first drift/analyzer region.

7. The ion mobility analyzer as in claim 1, wherein the first drift/analyzer region and the second drift/analyzer region are stacked parallel or arranged side by side.

8. The ion mobility analyzer as in claim 1, wherein the first drift/analyzer region and the second drift/analyzer region respectively comprise a series of electrode pairs arranged along the axis, a plane in which the electrode pairs are located is perpendicular to the gas flow direction, and radio frequency voltages with different phases are applied on the adjacent electrode pairs to form, in a direction perpendicular to the gas flow, a quadrupole field or a multipole field for confining ions.

9. The ion mobility analyzer as in claim 1, wherein the first drift/analyzer region and the second drift/analyzer region respectively comprise a series of electrode pairs arranged perpendicular to the axis, a plane in which the electrode pairs are located is parallel to the gas flow direction, and radio frequency voltages with different phases are applied on the adjacent electrode pairs to form, in a direction parallel to the gas flow, a quadrupole field or a multipole field for confining ions.

10. The ion mobility analyzer as in claim 1, wherein a segment of the second drift/analyzer region close to the detector comprises a plurality of electrodes, and voltages are applied on each of the plurality of electrodes to form an electric field for confining ions and focusing ions to the detector during transfer.

11. The ion mobility analyzer as in claim 1, wherein a mass analyzer is provided in a pre-stage, or a post-stage of the analyzer, or provided in both the pre-stage and the post-stage of the analyzer, so as to form an ion mobility and mass hybrid analyzer.

12. The ion mobility analyzer as in claim 1, wherein one of the first drift/analyzer region and the second drift/analyzer region is used as a first ion mobility filter allowing ions with mobilities higher than a first preset mobility to pass; and/or the other of the first drift/analyzer region and the second drift/analyzer region is used as a second ion mobility filter allowing ions with mobilities lower than a second preset mobility to pass.

13. The ion mobility analyzer as in claim 12, wherein the first preset mobility is less than the second preset mobility.

14. The ion mobility analyzer as in claim 1, wherein one of the first drift/analyzer region and the second drift/analyzer region is used as an ion mobility analyzer, which comprises a direct current electric field that varies with time so that ions having different ion mobilities pass through the analyzer region in different periods of time; and the other of the first drift/analyzer region and the second drift/analyzer region is used as an ion transfer and/or accumulation channel.

15. The ion mobility analyzer as in claim 14, wherein the first direct current electric field of the first drift/analyzer region scans with time so that ions having different ion mobilities pass in different periods of time and enter the second drift/analyzer region through the connection region, and the second direct current electric field of the second drift/analyzer region causes all ions to pass through the second drift/analyzer region to the detector.

16. The ion mobility analyzer as in claim 14, wherein the first direct current electric field of the first drift/analyzer region is a nonlinear direct current electric field so that ions are accumulated in at least a partial area of the first drift/analyzer region, the first direct current electric field varies with time so that ions pass through the first drift/analyzer region and enter the second drift/analyzer region through the connection region, and the second direct current electric field of the second drift/analyzer region scans with time so that ions having different ion mobilities pass through the second drift/analyzer region in different periods of time to the detector.

17. The ion mobility analyzer as in claim 14, wherein the first direct current electric field of the first drift/analyzer region causes all ions to pass through the first drift/analyzer region and enter the second drift/analyzer region through the connection region, and the second direct current electric field of the second drift/analyzer region scans with time so that ions having different ion mobilities pass through the second drift/analyzer region in different periods of time to the detector.

18. The ion mobility analyzer as in claim 1, wherein the direct current electric fields of the first drift/analyzer region and the second drift/analyzer region cause ions to move, along a direction perpendicular to the gas flow direction, from the ion source to the detector through the first drift/analyzer region and the second drift/analyzer region.

19. The ion mobility analyzer as in claim 1, wherein the direct current electric fields of the first drift/analyzer region, the second drift/analyzer region, and the connection region cause ions to pass through the first drift/analyzer region along a direction parallel to the gas flow direction to enter the connection region, enter the second drift/analyzer region through the connection region, and pass through the second drift/analyzer region along a direction parallel to the gas flow direction to the detector.

20. An ion mobility analysis method for separating and identifying ionic analytes, comprising:
providing a first electrode assembly, a second electrode assembly, a third electrode assembly, and a fourth electrode assembly located in planes parallel to each other, wherein each electrode assembly comprises a plurality of electrodes distributed along an axis in a same plane;
providing an ion source for generating ions;
providing a first drift/analyzer region, constituted by the first electrode assembly and the second electrode assembly, the first drift/analyzer region is provided with an ion entrance connected to the ion source, wherein the first drift/analyzer region comprises a first direct current electric field and a first gas flow, wherein the first direct current electric field and the first gas flow cause ions to move along an axis of the first drift/analyzer region, and wherein the first direct current electric field and the first gas flow apply opposing forces on ions;
providing a second drift/analyzer region, constituted by the third electrode assembly and the fourth electrode assembly, the second drift/analyzer region is provided with an ion exit, wherein the second drift/analyzer region comprises a second direct current electric field and a second gas flow, wherein the second direct current electric field and the second gas flow cause ions to move along an axis of the second drift/analyzer region, wherein the second direct current electric field and the second gas flow apply opposing forces on ions, and the second gas flow has the same gas flow direction as the first gas flow;
providing a connection region located between the first drift/analyzer region and the second drift/analyzer region, the connection region is constituted between electrodes at tail ends of the second electrode assembly and the third electrode assembly and a fifth electrode assembly, to connect the first drift/analyzer region and the second drift/analyzer region, wherein the connection region comprises a third direct current electric field that causes ions to transfer from the first drift/analyzer region to the second drift/analyzer region;

providing a detector connected to the ion exit; and injecting ions from the ion entrance along a direction perpendicular to the gas flow direction, and ejecting ions from the ion exit along the direction perpendicular to the gas flow direction.

21. The ion mobility analysis method as in claim 20, comprising: by controlling the direct current electric fields, using one of the first drift/analyzer region and the second drift/analyzer region as a first ion mobility filter allowing ions having mobilities higher than a first preset mobility to pass; and/or using the other of the first drift/analyzer region and the second drift/analyzer region as a second ion mobility filter allowing ions having mobilities lower than a second preset mobility to pass.

22. The ion mobility analysis method as in claim 20, comprising: using one of the first drift/analyzer region and the second drift/analyzer region, of which the direct current electric field varies with time, as an ion mobility analyzer so that ions having different ion mobilities pass through the ion mobility analyzer in different periods of time, and using the other of the first drift/analyzer region and the second drift/analyzer region as an ion transfer and/or accumulation channel.

23. The ion mobility analysis method as in claim 20, comprising: controlling the direct current electric fields of the first drift/analyzer region and the second drift/analyzer region so that ions move, along a direction perpendicular to the gas flow direction, from the ion source to the detector through the first drift/analyzer region and the second drift/analyzer region.

* * * * *